3,564,078
ALPHA-CYANOACRYLATE ADHESIVE
COMPOSITIONS
Thomas H. Wicker, Jr., and John M. McIntire, Kingsport,
Tenn., assignors to Eastman Kodak Company, Rochester, N.Y., a corporation of New Jersey
No Drawing. Filed May 17, 1968, Ser. No. 729,905
Int. Cl. C08f 15/16
U.S. Cl. 260—881
2 Claims

ABSTRACT OF THE DISCLOSURE

Alpha-cyanoacrylate adhesive compositions for surgical and other uses containing poly(ethyl 2-cyanoacrylate) as a viscosity modifier and an acidic component or a free radical scavenger as a polymerization inhibitor.

---

This invention relates to alpha-cyanoacrylate adhesive compositions for surgical and other uses. More particularly, the invention relates to sterile alpha-cyanoacrylate adhesive compositions containing poly(ethyl 2-cyanoacrylate) as a viscosity modifier.

The efficacy of the esters of alpha-cyanoacrylic acid as adhesives for general industrial and other uses is well known, having been described and claimed in numerous U.S. and foreign patents and in the literature. More recently, the medical and patent literature has disclosed that certain of these alpha-cyanoacrylates can be successfully used in many surgical applications as, for example, in the setting of fractured bone structures, as substitutes for, or adjuncts to, surgical sutures, in retarding the flow of blood from wounds and as aids in the repair and regrowth of living tissue generally. One of the problems encountered in the uses of these compositions, both as industrial and as surgical adhesives, has been control of the viscosity or flowability of the material when applied to surfaces to be bonded or otherwise treated.

To take a typical example, when an alpha-cyanoacrylate such as methyl alpha-cyanoacrylate, probably the best known and most widely used cyanoacrylate adhesive, is applied to surfaces to be joined, it can be applied in monomeric form, and the resultant polymerization of the ester in situ gives rise to the desired adhesive bond. However, the ester in this form is too fluid at ordinary temperatures to be controllable for certain applications. It is, therefore, necessary to provide a means of controlling the viscosity or flowability of the composition. This is accomplished by adding a viscosity modifier or thickener to the monomeric material.

In certain industrial applications a relatively high degree of fluidity may not be objectionable and may even be desirable, but for other industrial uses and for surgical uses, the viscosity or flowability of the composition must be controlled in order to prevent undue escape of the adhesive from any given area to which it is applied as well as to allow sufficient time for the monomeric material to polymerize and thus to bring about the desired bonding action.

The problem here dealt with has already been generally recognized by workers in this field and a rather wide variety of viscosity modifiers for alpha-cyanoacrylate adhesives have been suggested in patents and the literature. The present invention relates to a specific viscosity modifier having certain valuable and outstanding characteristics not heretofore recognized by workers in the field of cyanoacrylate adhesives. We have discovered these characteristics render this modifier especially and unexpectedly useful as a component of surgical and other adhesives, particularly its unique solubility in methyl alpha-cyanoacrylate monomer and the fact that it is biodegradable under conditions of surgical use.

A special requirement of alpha-cyanoacrylate adhesive compositions which are to be employed for surgical uses is that both the adhesive component and the viscosity modifier must be relatively non-toxic and each component must be biodegradable, that is, each must be susceptible to biochemical transformation or degradation which will result in harmless products which can be readily absorbed into and carried away from the point of application by the body fluids and thus ultimately eliminated from the system. As will be more fully set forth hereinafter, the adhesive compositions of the present invention fully meet these requirements.

This invention has as an object to provide alpha-cyanoacrylate adhesive compositions having viscosity and other characteristics which render it outstandingly useful as an adhesive.

Another object is to provide alpha-cyanoacrylate adhesive compositions having viscosity and other characteristics which render them particularly useful for surgical applications.

Another object is to provide methyl alpha-cyanoacrylate adhesive compositions particularly adapted for use in the surgical field and characterized by the fact that both the adhesive and the viscosity modifying components are biodegradable.

A further obect is to provide methyl alpha-cyanoacrylate adhesives for surgical and other uses containing a viscosity modifier which is characterized by an unusual degree of solubility in methyl alpha-cyanoacrylate.

A still further object is to provide a process for preparing polymers composed of poly(ethyl 2-cyanoacrylate) having unique solubility in methyl alpha-cyanoacrylate as well as having other properties which give them outstanding value as viscosity modifiers in surgical and other alpha-cyanoacrylate adhesive compositions.

Other objects will appear hereinafter.

These objects are accomplished by the following invention which comprises adding to the monomeric methyl ester of alpha-cyanoacrylic acid which has the general formula:

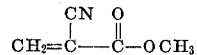

as a viscosity modifier, from about two percent to about seven percent by weight based on the weight of the total composition of poly(ethyl 2-cyanoacrylate) having an inherent viscosity up to about 2.5. The preferred percentage of the viscosity modifier added is from about two percent to about four percent based on the weight of the total composition and the preferred range of inherent viscosity of the material is from about .5 to about 2.5.

The methyl alpha-cyanoacrylate ester can be produced by the procedure of the U.S. patent to Joyner and Hawkins, 2,721,858, involving reaction of methyl cyanoacetate with formaldehyde in a non-aqueous organic solvent and in the presence of a basic catalyst, followed by pyrolysis of the anhydrous intermediate polymer in the presence of a polymerization inhibitor. A monomer prepared with low moisture content and essentially free of impurities has the best activity for surgical use. Another suitable process for preparing such alpha-cyanoacrylate esters is that described in the U.S. patent to Hawkins and McCurry, 3,254,111.

Our invention is based upon the discovery that stable, sterile viscous compositions of methyl 2-cyanoacrylate can be prepared by dissolving specially prepared poly (ethyl 2-cyanoacrylate) in monomeric methyl 2-cyanoacrylate. Such compositions may also contain polymerization inhibitors or stabilizers such as sulfur dioxide, hydroquinone or other well known polymerization inhibitors in such amounts as will give the compositions a satisfactory shelf life and will permit them to be heat stabilized at the temperatures usually employed for this purpose.

We have found that poly(ethyl 2-cyanoacrylate) is unique among all the polymers of the alkyl 2-cyanoacrylates in that these polymers, even those having high molecular weights, are highly soluble in methyl 2-cyanoacrylate. Our discovery of the unique properties of poly (ethyl 2-cyanoacrylate) as a viscosity modifier makes possible the production of highly valuable adhesive compositions for use in the surgical field as tissue adhesives as well as for use in other applications.

As indicated above, acceptance by the medical profession of a tissue adhesive requires that it be easily applied from a sterile package, that it does not cause an undue amount of toxic side effects and that it can be readily removed from the body during the normal healing process. The methyl 2-cyanoacrylate compositions thickened with high viscosity poly(ethyl 2-cyanoacrylate) in accordance with our invention meet all of these requirements. Available published data indicate that the polymer of methyl 2-cyanoacrylate is assimilated by the body at a faster rate than that of the other poly(alkyl 2-cyanoacrylates). The use of relatively small amounts of high molecular weight poly(ethyl 2-cyanoacrylate) thus does little to interfere with the rapid rate of removal of the polymerized adhesive. The introduction of only small amounts of high viscosity poly(ethyl 2-cyanoacrylate) into the monomeric methyl 2-cyanoacrylate also reduces the possibility of contamination of the composition and the production of either inactive or unstable compositions. This freedom from contamination is particularly important when the production of surgically sterile compositions is involved since minute traces of basic or free-radical catalysts can initiate polymerization of the viscous compositions at the usual sterilization temperatures of 120–130° C.

For the practice of our invention, we dissolve poly (ethyl 2-cyanoacrylate) having an inherent viscosity as high as 2.5 in monomeric methyl 2-cyanoacrylate to produce an adhesive composition with a solution viscosity of about 80 centipoises. Understandably, the amount of polymer required to attain any given solution viscosity will vary with the inherent viscosity of the polymer which, as previously indicated, may range from a very low value up to about 2.5, the preferred value being within the range of .5–2.5. In general, the preferred concentration of poly(ethyl 2-cyanoacrylate) dissolved in the monomer will be within the range of about 2–4 percent based on the weight of the composition. Once solution of the polymer is achieved, the composition is subjected to dry heat sterilization at temperatures of about 120–130° C., either in the final dispensing package or in a system from which it can be aseptically packaged in a convenient manner.

In order to stabilize the compositions of our invention against too rapid polymerization in use, and also to give them a satisfactory shelf life, one or more polymerization inhibitors may be employed. The inhibiting material may be an acidic stabilizer or a free radical scavenger. In some cases, both an acidic stabilizer and a free radical scavenger may be employed. A free radical scavenger may be defined as a material which has the ability to react with an unpaired electron to produce a substance which does not initiate further polymerization.

Examples of acidic stabilizers useful in the adhesive compositions of our invention are: sulfur dioxide, nitrogen oxide, phosphoric acid, phosphorous acid, boron trifluoride, organic acids having a pKa of 1 to 3, and polyphosphoric acid. For adhesive compositions designed for general or industrial uses, the stabilizer may be present to the extent of .0005–.06 percent by weight of the total composition, the preferred range being .0005–.003. In compositions designed for surgical uses, the stabilizer may be present in amounts within the range of .004–.25 percent by weight.

Among the free radical scavengers which may be employed as stabilizers in the adhesive compositions of our invention may be mentioned: hydroquinone, monomethyl ether of hydroquinone, butylated hydroxyanisole, butylated hydroxytoluene and t-butyl hydroquinone. For adhesive compositions designed for both general and surgical use, the free radical scavenger may be present to the extent of .001–.15 percent by weight of the total compositions, the preferred range being .08–.12 percent.

The following examples are included for a better understanding of the invention:

EXAMPLE I

Preparation of high viscosity poly(ethyl 2-cyanoacrylate)

This example illustrates the preparation of high viscosity poly(ethyl 2-cyanoacrylate). A mixture of freshly distilled ethyl 2-cyanoacrylate (10.00 g.), n-hexane (25.00 g.) and azobis(isobutyronitrile) (0.10 g.) is added to a 4 oz. clean, dry nitrogen-flushed high pressure bottle. The bottle is sealed with a crown closure after a final ten second purging with dry nitrogen, and then is tumbled in a water bath, first at 60° C. for 45 min. and finally at 50° C. for 9 hrs. The precipitated polymer is collected on a suction funnel, washed with an additional amount of hexane and dried in a circulating air oven at 50° C. overnight. The dried polymer (81.7% yield) has an inherent viscosity in nitromethane of 1.72.

EXAMPLE II

Preparation of a viscous adhesive composition for surgical use

To monomeric methyl 2-cyanoacrylate containing 0.085% hydroquinone and 270 p.p.m. sulfur dioxide is added 3.15% poly(ethyl 2-cyanoacrylate) (PECA). Solution is obtained by a slight heating of the mixture. The Brookfield viscosity of the resulting solution is 85 centipoises. This solution is then subjected to sterilization at 121° C. for 1 hr. and no change is observed in the solution viscosity. After the heated solution has been aged an additional two days at 85° C. the Brookfield viscosity is 87 centipoises. The table below summarizes these results and shows additional preparations in which this same polymer is dissolved in methyl 2-cyanoacrylate having different concentrations of sulfur dioxide and hydroquinone (HQ) as polymerization inhibitors.

| Concentration of PECA, percent | SO₂ Concentration, p.p.m. | Percent HQ | Viscosity, cps. | | |
| --- | --- | --- | --- | --- | --- |
| | | | Initial | After 1 hr. at 121° C. | After 2 days at 85° C. |
| 3.15 | 270 | 0.085 | 85 | 85 | 87 |
| 3.14 | 1,000 | 0.05 | 74 | 74 | 78 |
| 3.15 | 1,915 | 0.06 | 85 | 85 | 89 |

The immediately following examples (3–6) are included to illustrate the unique and unexpected solubility of poly (ethyl 2-cyanoacrylate) in methyl alpha-cyanoacrylate.

EXAMPLE III

An attempt was made to dissolve PECA (I.V.=2.03) in n-butyl 2-cyanoacrylate. To 50 g. of this monomer was added 2.0 g. of PECA. Solution was achieved by heating the mixture in a water bath at 60–70° C. The initial viscosity was 88 cps. and after four hours standing, a gel was present. This result indicates that the PECA was relatively insoluble in the n-butyl 2-cyanoacrylate.

EXAMPLE IV

A solution of 6.0% poly(isobutyl 2-cyanoacrylate) (I.V.=0.29) in methyl 2-cyanoacrylate was prepared by heating a mixture of the monomer and the polymer in a sealed bottle at 60–70° C. in a water bath. Although a solution was formed initially, polymer was observed to precipitate from the solution after it had returned to room temperature.

EXAMPLE V

A solution of 6.0% poly(n-butyl 2-cyanoacrylate) (I.V.–0.74) in methyl 2-cyanoacrylate was formed by heating the mixture of the monomer and the polymer in a sealed container in a water bath at 60–70° C. The dissolved polymer was observed to precipitate from the solution after it had cooled to room temperature.

EXAMPLE VI

To determine the ineffectiveness of high molecular weight poly(methyl 2-cyanoacrylate) as a thickening agent for monomeric methyl 2-cyanoacrylate, a mixture of 0.5 g. poly(methyl 2-cyanoacrylate) (I.V.=0.42) and 10 g. of methyl 2-cyanoacrylate was sealed in a glass bottle and heated in a water bath at 60° C. for 8 hours. The polymer did not dissolve in the monomer under these conditions.

Reference is now made to Example I which discloses the process by which this unusual polyvinyl 2-cyanoacrylate) component is prepared. We have found that by preparing the ethyl ester by this specific procedure its unusual and unexpected solubility and other properties are attained. So far as we are aware, this is a novel process not heretofore disclosed in the art. Accordingly, we claim the process as a novel and technological advance in the art of producing poly(alpha-cyanoacrylates).

It will thus be evident from the above description of our invention that we have provided a novel means of controlling the viscosity of methyl alpha-cyanoacrylate adhesive compositions, particularly those intended for surgical uses, by the employment as a viscosity modifier of poly(ethyl 2-cyanoacrylate) prepared in such a manner as to give it unique and unexpected solubility in methyl alpha-cyanoacrylate and also characterized by the fact that relatively very small amounts of the modifier is required to attain a given solution viscosity in adhesive compositions made up of these components.

The invention has been described in detail with particular reference to certain preferred embodiments thereof, but it will be understood that variations and modifications can be effected within the spirit and scope of the invention as described hereinabove and as defined in the appended claims.

We claim:
1. An adhesive composition containing as its essential adhesive component methyl 2-cyanoacrylate and as a viscosity modifier poly(ethyl 2-cyanoacrylate).
2. The composition of claim 1 which contains up to about 93–98% by weight of monomeric methyl 2-cyanoacrylate, and about 2% to about 7%, based on the weight of the composition, of poly(ethyl 2-cyanoacrylate) having an I.V. of about .5 up to about 2.5.

References Cited

UNITED STATES PATENTS 3,178,379   4/1965   Wicker et al. _____ 260—17

SAMUEL H. BLECH, Primary Examiner

R. J. SEIBERT, Assistant Examiner

U.S. Cl. X.R.

128—92, 334; 260—45.7, 45.9, 45.95, 88.7; 424—81